United States Patent [19]

Tweddell, III

[11] Patent Number: 4,827,666

[45] Date of Patent: May 9, 1989

[54] METHOD AND APPARATUS FOR MOLDING FRUITS

[76] Inventor: Richard Tweddell, III, 2207 Upland Pl., Cincinnati, Ohio 45206

[21] Appl. No.: 24,865

[22] Filed: Mar. 12, 1987

Related U.S. Application Data

[63] Continuation-in-part of Ser. No. 869,470, May 28, 1986, abandoned, which is a continuation-in-part of Ser. No. 839,522, Mar. 14, 1986, abandoned.

[51] Int. Cl.⁴ .................. A01G 1/00; A41G 1/02
[52] U.S. Cl. ............................. 47/58; 47/26; 249/55
[58] Field of Search ............... 47/26, 29, 3; 264/337; 249/55

[56] References Cited

U.S. PATENT DOCUMENTS

| | | | |
|---|---|---|---|
| 1,908,394 | 5/1933 | Wilson | 47/3 |
| 1,996,525 | 4/1935 | Sage | 47/30 X |
| 2,096,507 | 10/1937 | Czeszcziczki | 47/58 |
| 2,352,083 | 6/1944 | Detjen | 249/55 X |
| 3,093,866 | 6/1963 | Angioletti | 249/55 |
| 3,309,738 | 3/1967 | Friedman | 19/26 |
| 3,332,658 | 7/1967 | Lemelson | 249/139 |
| 3,955,321 | 5/1976 | Payton | 47/58 |
| 4,187,639 | 2/1980 | Ono | 47/58 |
| 4,206,899 | 6/1980 | Whitehead | 249/55 X |

FOREIGN PATENT DOCUMENTS

| | | | |
|---|---|---|---|
| 35043 | 3/1979 | Japan | 47/26 |
| 627781 | 5/1977 | U.S.S.R. | 47/26 |
| 4532 | of 1879 | United Kingdom | 47/26 |
| 13751 | of 1899 | United Kingdom | 47/26 |

Primary Examiner—Robert E. Bagwill
Attorney, Agent, or Firm—Wood, Herron & Evans

[57] ABSTRACT

A method and apparatus for growing squash, cucumbers and other fruits in desired shapes. The fruit, while growing on the plant, is enclosed within the internal cavity of an oversized mold having a cavity (inside) surface configured to form the desired details on the fruit. As growth continues the fruit fills the cavity and in doing so conforms with remarkable fidelity to the internal details of the mold. The mold is yieldable so as to allow the fruit to continue to expand outwardly after it has grown against the mold. The mold can be opened or removed after the fruit has conformed to its details, and the fruit is removed from the plant. The fruit can be eaten or, if dried, can provide a long-lasting sculptural item.

17 Claims, 2 Drawing Sheets

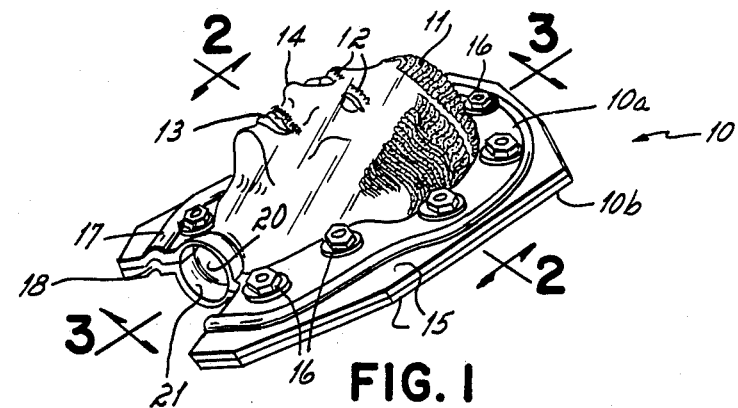
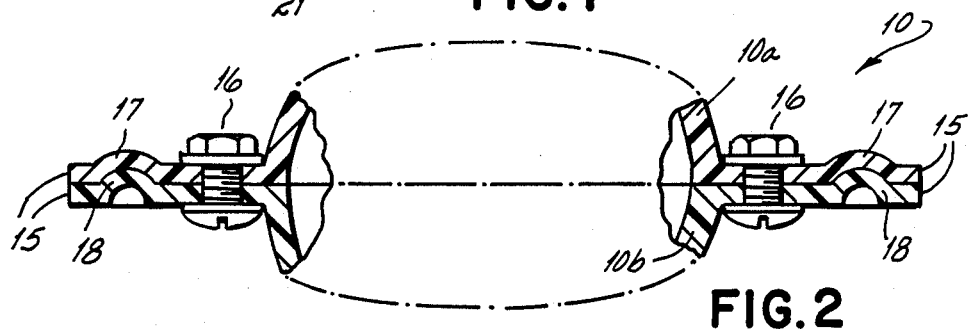
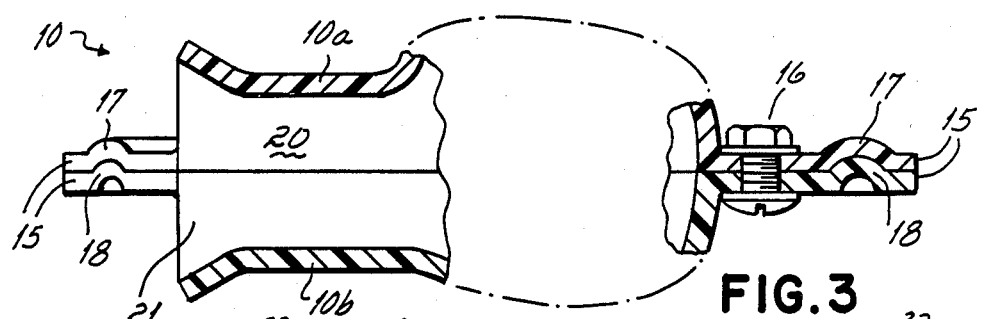
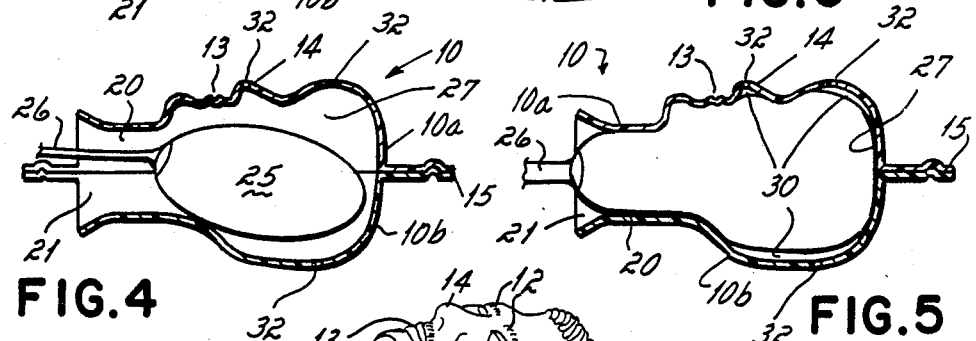
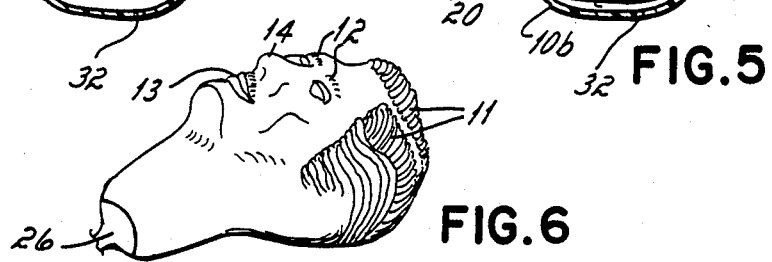

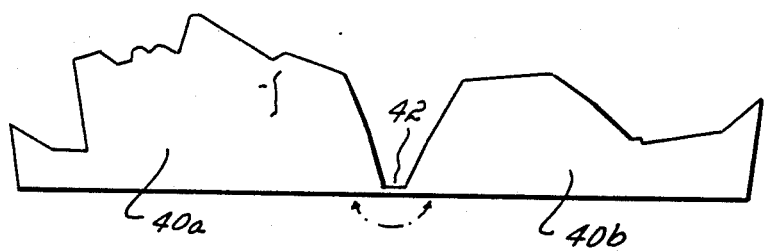
FIG. 7
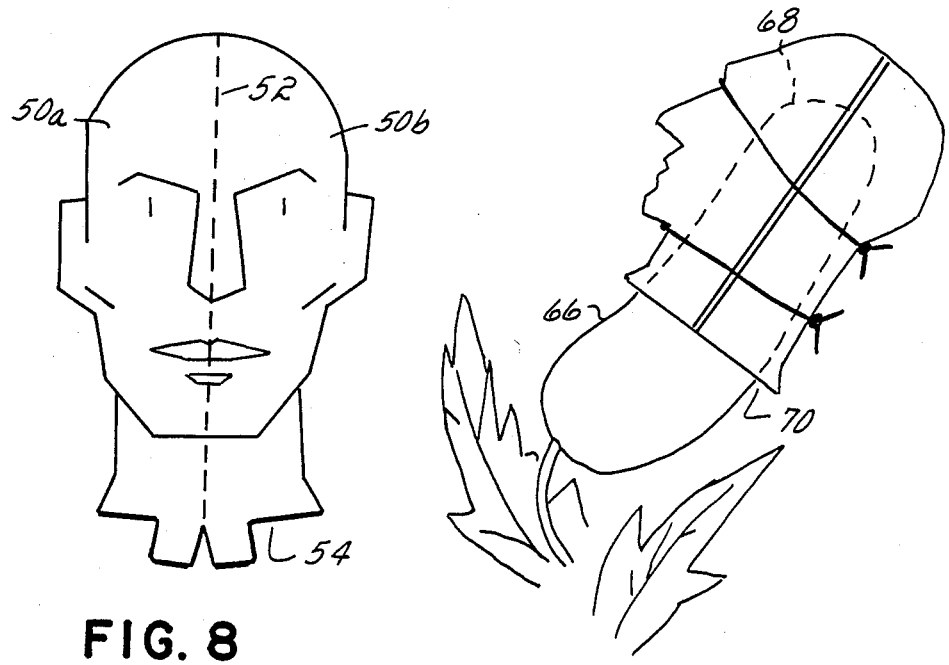
FIG. 8
FIG. 10
FIG. 9
FIG. 11

METHOD AND APPARATUS FOR MOLDING FRUITS

CROSS REFERENCE TO RELATED APPLICATION

This application is a continuation-in-part of my co-pending application Ser. No. 869,470, filed May 28, 1986, now abandoned, which was in turn a continuation-in-part of my then co-pending application Ser. No. 839,522, filed Mar. 14, 1986, also now abandoned.

FIELD OF THE INVENTION

This invention relates relates to the art of gardening, and more particularly to growing fruit in desired shapes and with desired surface details.

BRIEF DESCRIPTION OF THE INVENTION

Almost every home gardener has tried his or her luck with growing fruits or vegetables such as zucchini, pumpkins, gourds, cucumbers, squash and the like. Given a thumb which is even slightly green, it is quite easy to grow such produce in the home garden. However, the very commonplace nature of such home produce, particularly at the end of summer when everyone seems to have bushels of it, sometimes makes raising it seem like an ordinary accomplishment, devoid of special interest.

I have now discovered a method and apparatus whereby the average home gardener can grow these conventional, garden variety fruits and vegetables in a wide variety of astonishing configurations and desired fanciful shapes. For example, they can be caused to grow in the image of a particular person; in the shape of a different type of produce (e.g., a summer squash grown in the shape of an ear of corn); a fanciful shape such as a heart, or a bottle of pop; or other simple or even quite detailed shapes. A zucchini in the likeness of Clark Gable, for example, complete with mustache, would be no ordinary sight on the dinner table. Similarly, a Christmas tree ornament formed of a small, configured gourd is a very distinctive novelty.

Moreover, those fruits which have natural stripes or colored markings on them can be grown so that the stripes or colors become an integral part of the design and greatly contribute to its overall decorative effect.

Importantly, this invention simplifies the growing procedure, in comparison to previous "designer fruit" growing techniques, in that it affords the grower more latitude in the growing procedure, especially as to when the fruit is "finished."

My invention requires no special growing conditions or chromosomal alteration of the plant. On the contrary, it is a system of molding growing plant material which is applicable to a wide variety of species, including gourds, pumpkins, cucumbers, squash, other members of the cucurbit family, as well as melons, eggplants and fruits still to be tested. For simplicity I have referred to all of these as "fruits," whether or not they are technically fruits or vegetables or other plant matter.

The invention is perhaps most readily practiced with zucchini because they grow vigorously, rapidly and well under so many different gardening conditions.

In accordance with my invention, the young fruit, while attached to the plant and growing, is placed within the mold cavity of an oversize mold, i.e., a mold which is larger than the fruit. The mold cavity is configured on its inside surface with the details to be reproduced. The only restrictions on the mold details are that the mold must be releasable so as not to trap or permanently lock in any part of the fruit. The mold is "yieldable"; that is, it is made of a material which will stretch or expand somewhat under the force of the growing fruit so as not to rigidly constrict the fruit. This has been found to provide a surprising and important benefit in respect to the criticality of timing the removal of the grown molded fruit from the mold, as further described below.

The mold should be transparent, over at least a major part of its area, so that sunlight can reach the fruit as it grows within the mold. While it is possible to use a opaque mold for short periods of time, this generally blanches the product, slows growth rate and does not as readily provide such effective results. The mold can have some opaque or translucent areas to provide mottled, striped or desired coloration effects. The mold must contain an opening through which the stem of the fruit can extend. This opening should be larger than the stem so that it will not constrict the stem or cut off flow to the fruit as it grows in the mold. If the mold comprises separable sections which together define the cavity, the sections are typically held together around the fruit by bolts, clips, ties, or straps. The growing fruit exerts a surprisingly great force which tends to open the mold, and mold sections should be tightly secured or the fruit will grow between them instead of filling and "bulging" the entire yieldable mold.

Where the mold has pockets or high areas, in which air would be trapped or confined by the growing vegetable, it is desired to provide small ports of air vents from which air can be displaced by the growing fruit. Ultimately the fruit expands so that it virtually completely fills the entire mold cavity. As this occurs the fruit conforms to the internal details of the mold with remarkable fidelity. For example, if the mold is that of a head of a person, details of hair, eyebrows, nose and mouth can be reproduced with very surprising accuracy.

For best results, it is desirable to minimize the time the fruit is in the mold. For this reason the fruit should preferably be inserted in the cavity when the fruit is as large as will fit without being squeezed or crushed by the mold. Preferably a multipart mold is assembled around a fruit which is bigger than the diameter of the stem aperture. Usually fruits will grow to fill the mold within 10–20 days.

The mold sections can be removed from the fruit, or the fruit otherwise released, when the fruit has grown to completely fill the cavity or even after it has started to expand or bulge the mold. The fruit can then be cut off the stem. While the fruit provides a remarkable visual novelty, its edibility is not affected. Moreover, fruits such as gourds which have a skin that hardens will last for extended periods of time and will retain the molded configuration indefinitely.

THE PRIOR ART

I am aware that others have grown fruit inside bottles, to a size such that they cannot be removed from the mouth of the bottle. The fruit is usually pickled inside the bottle, to form a boat-in-the-bottle-like curiousity. However, the bottle cannot be removed without smashing it, and the technique does not provide a fruit with any particular surface detail, much less a method of growing a fruit to a desired configuration. Moreover, the success ratio is poor, because the fruit must be placed in the bottle while it is still small enough to fit through the relatively small mouth. This requires a long confinement time, which often leads to disfiguration, disease or spoilage in the bottle.

The U.S. Pat. No. 2,096,507, to Czeszcziczki, and Ono, U.S. Pat. No. 4,187,639, show fruit molding processes using two-part removable molds which rigidly enclose a growing fruit, to form details on the fruit surface. Those molds are unyielding, and the techniques require carefully watching the size of the fruit as it fills the mold, in order to avoid compression damage to the fruit, surface scaring and/or rotting if the fruit is allowed to remain in the mold after it begins to press the mold surface outwardly.

DESCRIPTION OF THE DRAWINGS

The invention can best be further explained by reference to the accompanying drawings in which:

FIG. 1 is a perspective view of a two-part mold in accordance with a preferred embodiment of the invention, contoured to represent a man's head;

FIG. 2 is an enlarged section, partly broken away, taken on line 2—2 of FIG. 1;

FIG. 3 is an enlarged longitudinal section, partly broken away, taken on line 3—3 of FIG. 1;

FIG. 4 is a diagrammatic view showing the relative sizes of the mold and a fruit which has just been placed in the mold;

FIG. 5 is a view similar to FIG. 4, but shows a fruit more nearly fully grown in the mold cavity;

FIG. 6 is an illustration of a fruit configured in the mold of FIG. 1, after the mold has been removed and the fruit has been cut from the stem;

FIG. 7 is a side elevation of a modified embodiment of the invention, and shows a one-piece mold having two sections which are hinged together;

FIG. 8 is a front elevation of another embodiment, and shows a one-piece mold having a line of weakness along which it will separate so that the fruit can be removed;

FIG. 9 is a perspective view of another embodiment, and shows a unitary mold formed as a sleeve;

FIG. 10 is a diagrammatic view showing a mold which is molding only an end portion of a growing fruit; and FIG. 11 is an exploded broken away perspective showing the use of a quick-acting connector to secure aligned flanges of a multipart mold.

DETAILED DESCRIPTION

A multipart mold in accordance with a preferred embodiment of the invention is designated generally in the drawings by 10 and includes an upper half 10a and a lower half 10b. The particular mold shown for purposes of explanation is configured on its inside surface in the form of a man's head with the upper mold part 10a forming the front of the head and the lower part of the mold 10b forming the rear of the head. The mold may include and will transfer to the fruit small details such as hair 11, eyebrows 12, mouth 13, nose 14, and other details. These are not shown in detail in FIGS. 2-5 and will in any event depend on the particular subject represented. It should be noted that the mold can conform to a very wide variety of shapes.

The mold halves 10a and 10b may each be provided with an outwardly extending or peripheral flange 15 which, when the mold halves are in assembled relation, facially engage one another and which are releasably held together as by closely spaced bolts 16 or by quick-acting connectors as shown in FIG. 11. For mold alignment the flanges maybe formed with a peripheral locator groove and rib 17 and 18 which interfit (see FIGS. 2 and 3). This optional locator should be outward of the releasable securing means 16; that is, the bolts should be positioned on the flange as close to the mold cavity as possible, to better resist the formation of a mold line on the growing fruit.

At one end the mold has a stem opening 20 which is large enough to accommodate the stem at approximately full growth. In the mold shown in the drawing, this opening 20 is formed at the neck. The spacing 20 should be outwardly flared, as at 21, like a bell, so that it does not abrade or constrict the stem as the fruit moves.

As previously suggested, I have found that a surprising advantage is obtained by making the mold sufficiently flexible or yieldable that it can stretch or "give" gradually as the fruit begins to exert outward force on it, and to increase in size somewhat to accommodate further growth. I have found that such mold flexibility reduces the fruit spoilage, rupture or injury that otherwise tends to occur when the fruit grows into engagement with an inward edge or projection of the mold.

When the fruit has substantially completely filled the chamber of a rigid mold, the mold must be opened and the fruit removed promptly (within a day or two, under rapid growth conditions) to avoid spoilage, deformation or rupture of the fruit. Where the mold is yieldable, however, in accordance with this invention, the force of the fruit is distributed over a wider area and damage to the fruit is eliminated or reduced. The fruit can be left in a yieldable mold several days beyond the time when it would have to be removed from (or be damaged by) an unyieldable mold. This greatly simplifies matters for the grower, who otherwise would have to inspect the size of each fruit every day or two; some latitude in timing is afforded to him.

The mold can conveniently be formed by injection molding or vacuum-forming sheet plastic. The material used should be a flexible thermoplastic which can yield as the fruit begins to exert outward force against it. Preferably the material should also be ultraviolet stabilized, to withstand degradation by sunlight in the field. One example of a suitable material is transparent butyrate sheet of about $\frac{1}{8}$" thickness. A preferred material is the ultraviolet stabilized butyrate material sold under the trademark "UVEX" by Eastman Chemical Company of Kingsport, Tenn. By way of example, a mold of this material having an internal cavity of about 3–4" diameter will expand by about $\frac{1}{4}$" in diameter (roughly 5–10%) in a typical use. The material will continue to stretch if the fruit is left to continue to grow in it, and can even stretch as much as 1". The material is thus gradually and progressively deformed; it is not elastic, and does not recover after stretching. It becomes permanently enlarged, and its wall thickness is reduced by the stretching.

In carrying out the method of the invention, a small growing fruit indicated at 25 in FIG. 4, which may be a zucchini still attached to the stem 26 of the growing plant, is placed within the mold cavity 27. Typically the mold halves 10a and 10b will be disassembled for this purpose and reassembled over the fruit, but in some molds the fruit may be small enough to be inserted through the stem opening 20. The fruit should be inserted when it is smaller than the mold cavity so that it is not initially constricted by any part of the cavity.

As the fruit grows, it gradually fills the mold as shown in FIG. 5. It can be seen that, depending upon the specific design selected, the mold may have high spots or internal pockets as designated at 30, which the growing fruit would gradually close off from other regions within the internal chamber. Air could be trapped in these pockets which would prevent growth into them. For that reason small air holes 32 (for example about 1/16" diameter) should be formed through the mold into the apex of each pocket so that air can be displaced from the pockets by the growing fruit. These holes should be so small that the fruit does not grow into them, else they will undesirably show on the molded fruit.

After the fruit substantially fills the mold cavity, it can be removed immediately or, as indicated above, it can remain in the mold and the mold will yield to accommodate some further size increase. This "extra" mold time affords more uniform and fuller ripening, better conformation of details, and avoids need for such prompt removal when the fruit has filled the mold.

FIG. 6 indicates the appearance of a zucchini grown in the mold of FIG. 1, after the fruit attained full size therein and was removed. The details of hair, eyebrows, nose, and mouth appear with remarkable fidelity in the final object. The mold can be reused, but becomes progressively enlarged.

Following are two specific examples of growing different fruits in accordance with the invention.

EXAMPLE 1

As a typical but not limiting example of the preferred method of practicing the invention, a growing zucchini which is about 2½ inches long and about 1 inch in diameter, is placed within a mold which is about 4 inches long, 3 inches wide, and 3 inches high, internally configured in the shape of a movie celebrity. The young zucchini is arranged so that its stripes run from the top of the head, toward the neck; this makes the final appearance all the more unusual. Over a period of 1-2 weeks the fruit continues to grow within the mold, expanding until it fills the mold cavity. The zucchini can remain in the mold for several days thereafter (even up to one month, although this is not recommended); the mold relaxes outwardly by about ¼" in diameter or more, and thereby relieves localized piercing or rupture. No special fertilization or other conditions are required.

EXAMPLE 2

As another example, an eggplant about 3" long and 1¼" diameter is placed within a mold having a cavity in the shape of a cabbage, roughly 4" in diameter. The eggplant completely fills the mold in about 2½ weeks, and is then removed.

In general the success obtained will depend on the type and vigor of the plant, the growing conditions, freedom from disease and availability of moisture and nutrients. Cucurbits provide the most consistently good results; tomatoes unfortunately are more susceptible to splitting and disease in the mold.

Apart from its use in producing food items in novel shapes, the invention makes it possible to use growing vegetable matter as a molding medium.

Gourds and other plants having thick skins which have been molded by the present method can be allowed to harden, or dried, to form eye-catching objects. For example, gourds can be dried, painted and internally weighted to form a horticultural chess set; or they can be made into naturalistic Christmas tree ornaments.

In the embodiment just described, the mold is multiparted, comprising two separate sections which are fastened together. The invention also contemplates a unitary mold from which the fruit can be removed either axially or by displacement of movable portions of the mold. Various forms of unitary molds are shown in FIGS. 7-9.

In FIG. 7, the unitary mold has two sections 40a and 40b which are hinged together by a bendable strip 42 between them. The sections are closed around the fruit and are held together by securing means such as one or more flexible ties or, if flanges are provided, by bolts, spring clips, or the like.

The unitary mold of FIG. 8 has integral sections 50a, 50b, which are connected by a line of weakness 52 extending around the mold. This line of weakness may be formed as a strip of reduced thickness or by a line of perforations along which the mold sections can be separated. The line of weakness can be ruptured by manual exertion when desired, or by the outward force of the growing fruit within the mold. The yieldability of the mold accommodates uneven growth, and allows the fruit to grow until the mold cavity is completely filled and the fruit has ripened more uniformly. The line of weakness may be designed to rupture only when the internal force would become excessive, preferably when it has enlarged by at least 5%, so that the fruit is automatically released at full growth.

In this mold the fruit is inserted through the open end 54 of the mold while the fruit is still small in diameter. Hence the fruit may have to remain in the mold longer, and for that reason a mold which cannot be opened to receive a small fruit is less useful than those previously described. However, it should be noted that the use of lines of weakness can facilitate the molding of more complex shapes, even shapes with undercuts; moreover, the lines of weakness make the timing of fruit removal of less importance.

FIG. 9 shows a wide mouth mold 60 of sleeve or cylindrical configuration. This mold has a cross-sectional shape which is generally uniform along its axial length, although it is preferably tapered or reduced in size toward a smaller end 62 which is remote from the stem-facing or larger end. This type of mold is useful to make elongated fruits having uniform cross section, for example, hearts, diamonds, etc. The fruit is removed by pushing it endwise through the larger (stem) end opening of the mold; when sliced crosswise, uniform decorative shapes are formed. Alternatively, a line or lines of weakness can be provided for self-release at a certain size.

It is also contemplated that the molds described above may be used to shape only an end part 68, but not the base 66 of the fruit, as shown in FIG. 10. In carrying out this method, the stem opening 70 should be shaped to provide a gradual transition between the confined (molded) and unconfined portions of the fruit. It should be noted, however, that success with this technique is more difficult because of the different growing environments between the two portions of the fruit.

FIG. 11 shows a quick acting connector 72 which is useful to rapidly secure mold parts together. This connector has an integral shank 74, head 76, thumbscrew 78, and opposite locking wings 80 at the end of shank 74. When the corresponding openings 81, 81 in two flanges 85, 85 are aligned, the locking wings 80 are passed through radial or slot-like extensions of the openings and the connector is given a quarter turn so that the locking wings move up opposed quarter circumference cam ramps 82 on one of the flanges, until the wings are seated in recesses 84 at the ends of the ramps. Since a multiplicity of connectors may be needed to hold the parts of a large mold together against the separating force of a growing fruit, to avoid formation of a pronounced mold line on the fruit, the use of this or another quick-acting type of connector will facilitate assembly of molds in the field.

In addition to use by home gardeners to form three-dimensional sculptured novelties, as described above, the invention can also be used commercially to mold fruits in shapes for seasonal sale in grocery stores. Thus, heart-sectioned fruits can be grown for sale at Valentine's Day; fruits with the cross-sectional shape (outline) of a turkey, at Thanksgiving time; or a pumpkin shape for Halloween. The invention also makes possible the concept of molding the logo of, say, a pickle company, directly into the side of a pickle itself.

Having described the invention, what is claimed is:

1. A method of growing a fruit to form a desired likeness of a preselected three-dimensional object, comprising,
   growing a plant to produce a young fruit which is increasing in size on its stem,
   while said fruit is on the plant and is substantially smaller than its ultimate expected size, positioning at least an end portion of the fruit within an oversize cavity of a mold, said mold cavity having an inside surface configured with molded surface details in accordance with the preselected object and being sufficiently larger than the fruit that it does not crush the fruit, but smaller than the size to which the fruit ordinarily grows,
   said mold being formed of a material which will gradually and progressively yield by bulging outwardly under the pressure of the growing fruit as the fruit fills the mold,
   continuing to grow the plant with the fruit so enclosed, until the enclosed portion of the fruit has grown to the size of mold cavity and has substantially conformed to the surface details of the inside surface configuration thereof, and
   removing the mold from around the fruit and removing the fruit from the plant,
   the mold yielding outwardly by bulging if the fruit is allowed to remain in the mold after it has filled the mold cavity, thereby accommodating further increase in size of the fruit and avoiding damage to the fruit which would occur if the mold did not thus yield outwardly.

2. The method of claim 1 wherein said mold is made of thermoplastic material and said cavity has a depth which gradually increases by at least about 5% as said fruit exerts outward pressure on said mold from continuing growth therein.

3. The method of claim 1 including the initial step of forming said mold of ultraviolet stabilized butyrate plastic.

4. The method of claim 1 wherein said mold has one or more lines of weakness along which it can be separated to release said fruit.

5. The method of claim 4 wherein said lines of weakness are ruptured by outward force of the growing fruit, after the fruit has reached a desired size.

6. The method of claim 1 wherein said mold is in the form of a tapered sleeve of uniform cross-sectional shape along its axis, and is removed from the fruit by moving the fruit endwise through an end of the mold.

7. The method of claim 1 wherein said mold cavity has an aperture through which a stem of said fruit extends and said young fruit is placed within said mold cavity when larger than the diameter of said aperture but is not squeezed within said cavity.

8. The method of claim 1 wherein said mold cavity has pockets having apexes which are vented by small openings to atmosphere so that air can be displaced from them as the fruit grows into such pockets,
   said openings being so small that the fruit does not show them on its surface.

9. The method of claim 1 wherein said mold comprises mold parts having mating peripheral flanges, the flanges being held together to resist the force exerted on the mold parts by the growing fruit.

10. The method of claim 1 wherein the mold is opaque in some areas of its surface and transparent in other areas, thereby causing the fruit grown in the mold to display differential surface coloration corresponding to said areas.

11. A mold for growing a fruit to a desired shape,
    said mold having an internal cavity with an inside surface configured with molded details in accordance with said desired shape,
    said mold made of a yieldable material which gradually and progressively bulges outwardly in response to outward force exerted on it by a fruit growing within it, to accommodate further growth of said fruit after said fruit has grown into contact with said inside surface of the cavity,
    said inside surface retaining said molded details as it bulges outwardly,
    said mold being made of an ultraviolet stabilized butyrate plastic.

12. A mold for growing a fruit to a desired shape,
    said mold having an internal cavity with an inside surface configured with molded details in accordance with said desired shape,
    said mold made of a yieldable material which gradually and progressively bulges outwardly in response to outward force exerted on it by a fruit growing within it, to accommodate further growth of said fruit after said fruit has grown into contact with said inside surface of the cavity,
    said inside surface retaining said molded details as it bulges outwardly,
    said mold comprising at least two sections which are hinged together so that they can be opened to receive a young fruit and to release the fruit after it has grown to fill the mold.

13. A mold for growing a fruit to a desired shape,
    said mold having an internal cavity with an inside surface configured with molded details in accordance with said desired shape,
    said mold made of a yieldable material which gradually and progressively bulges outwardly in response to outward force exerted on it by a fruit growing within it, to accommodate further growth of said fruit after said fruit has grown into contact with said inside surface of the cavity,
    said inside surface retaining said molded details as it bulges outwardly,
    the mold having a line of weakness along which it will rupture under force of the fruit growing in it, to release the fruit when such fruit has grown to a size at least 5% larger in transverse dimension than that of the mold before the fruit was placed in it.

14. A mold for growing a fruit to a desired shape,
said mold having an internal cavity with an inside surface configured with molded details in accordance with said desired shape,
said mold made of a yieldable material which gradually and progressively bulges outwardly in response to outward force exerted on it by a fruit growing within it, to accommodate further growth of said fruit after said fruit has grown into contact with said inside surface of the cavity,
said inside surface retaining said molded details as it bulges outwardly,
said cavity including localized surface indentations which will be sealed from the rest of the cavity by growth of the fruit thereinto,
a small aperture extending through said mold to the apex of each said surface indentation, to permit air to be displaced therefrom as the fruit grows,
said aperture being so small as not to be molded onto the surface of the fruit.

15. The mold of claim 14 wherein said internal cavity has a depth transverse to said fruit which can bulge outwardly by an amount of at least about 5% in depth.

16. The mold of claim 14 wherein said mold has some opaque areas and some transparent areas, to define differently colored areas on the fruit.

17. The mold of claim 14, wherein said cavity completely encloses said fruit except for said aperture and for a single endwise opening sized to admit a fruit into said cavity at the start of growing therein.

* * * * *